United States Patent
Bolle

(10) Patent No.: US 9,223,099 B2
(45) Date of Patent: Dec. 29, 2015

(54) OPTICAL DEVICE

(71) Applicant: Alcatel-Lucent USA Inc., Murray Hill, NJ (US)

(72) Inventor: Cristian A. Bolle, Bridgewater, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 277 days.

(21) Appl. No.: 14/039,374

(22) Filed: Sep. 27, 2013

(65) Prior Publication Data

US 2015/0093068 A1   Apr. 2, 2015

(51) Int. Cl.
*G02B 6/12* (2006.01)
*G02B 6/42* (2006.01)

(52) U.S. Cl.
CPC .............. *G02B 6/4214* (2013.01); *G02B 6/12* (2013.01); *G02B 2006/12085* (2013.01)

(58) Field of Classification Search
None
See application file for complete search history.

(56) References Cited

U.S. PATENT DOCUMENTS 7,024,079 B2 *   4/2006   Komiya et al. .............. 385/49
2011/0129181 A1   6/2011   Bolle

OTHER PUBLICATIONS

Yi Wei Xu, et al, Formation of ultra-smooth 45° micromirror on (1 0 0) silicon with low concentration TMAH and surfactant: Techniques for enlarging the truly 45° portion, Dec. 18, 2010, pp. 164-171.

* cited by examiner

*Primary Examiner* — Michelle R Connelly
*Assistant Examiner* — Hoang Tran
(74) *Attorney, Agent, or Firm* — Hassan Shamsaei Far

(57) ABSTRACT

An apparatus is disclosed comprising a planar optical waveguide structure which includes a substrate and two planar optical waveguides thereon. The apparatus further comprises a solid structure having a body and two branches connected to the body. Each of the two branches has a reflective surface area thereon. Each of the two planar optical waveguides is configured to optically couple light from an end thereof to the reflective surface area of a corresponding one of the branches. The planar optical waveguide structure further includes a third planar optical waveguide on the substrate. The third planar optical waveguide has a segment located between the solid structure and the substrate.

19 Claims, 7 Drawing Sheets

OPTICAL DEVICE

TECHNICAL FIELD

The present disclosure is directed, in general, to an optical device.

BACKGROUND

Planar lightwave circuits (PLCs) are known and used in many optical applications, such as optical communications and spectroscopy. In many of such applications, the light traveling through the PLC is then typically detected and converted into an electric signal which is then used for processing information in the further stages of the particular application or equipment.

SUMMARY

According to some embodiments there is provided an apparatus comprising a planar optical waveguide structure including a substrate and two planar optical waveguides thereon; a solid structure having a body and two branches connected to the body, each of the two branches having a reflective surface area thereon; each of the two planar optical waveguides being configured to optically end-couple to the reflective surface area of a corresponding one of the branches; wherein the planar optical waveguide structure includes a third planar optical waveguide on the substrate, the third planar optical waveguide having a segment located between the solid structure and the substrate.

According to some specific embodiments the apparatus comprises a plurality of cavities wherein a portion of a branch of the solid structure is located inside a cavity and a portion of the body of the solid structure is located outside the cavity.

According to some specific embodiments a branch is joined to the body at one end and has a respective reflective surface area at an opposite end, the reflective surface area being sloped with respect to a direction of propagation of light from a corresponding planar optical waveguide to the reflective surface area.

According to some specific embodiments the slope of the reflective surface area is at an angle configured to reflect the light propagating in said first direction to a second direction, said second direction being in a range of about 70° to about 110° with respect to the first direction.

According to some specific embodiments the slope of the reflective surface area is at an angle in a range of about 35° to about 55° with respect to the first direction.

According to some specific embodiments the slope of the reflective surface area is at an angle of about 45° with respect to the first direction.

According to some specific embodiments, at least one planar optical waveguide is configured to tap at least a portion of light from another planar optical waveguide and direct said at least a portion of light to a corresponding reflective surface area without crossing another planar optical waveguide.

According to some specific embodiments, the apparatus comprises a first planar optical waveguide and a second planar optical waveguide and a splitter configured to couple at least a portion of light from the first planar optical waveguide into the second planar optical waveguide, the second planar optical waveguide being configured to direct said at least a portion of light to a corresponding reflective surface area without crossing another optical waveguide from the plurality of optical waveguides.

Some embodiments provide an apparatus comprising: a planar optical waveguide structure including a substrate and two planar optical waveguides thereon; a solid structure having a body and two branches connected to the body, each of the two branches having a reflective surface area thereon; each of the two planar optical waveguides being configured to optically end-couple to the reflective surface area of a corresponding one of the branches; wherein the planar optical waveguide structure includes a third planar optical waveguide on the substrate, the third planar optical waveguide having a segment located between the solid structure and the substrate; and an array of optical detectors.

According to some specific embodiments a branch is joined to the body at one end and has a respective reflective surface area at an opposite end, the reflective surface area being sloped with respect to a direction of propagation of light from an end of a corresponding planar optical waveguide, to a second direction different from the first direction and an optical detector from the array of optical detectors is configured to receive and detect the light beam propagating in the second direction.

According to some specific embodiments the slope of the reflective surface area is at an angle configured to reflect the light propagating in said first direction to said second direction, said second direction being in a range of about 70° to about 110° with respect to the first direction.

According to some specific embodiments the slope of the reflective surface area is at an angle in a range of about 35° to about 55° with respect to the first direction.

According to some specific embodiments the slope of the reflective surface area is at an angle of about 45° with respect to the first direction.

According to some specific embodiments, at least one planar optical waveguide is configured to tap at least a portion of light from another planar optical waveguide and direct said at least a portion of light to a corresponding reflective surface area without crossing another planar optical waveguide.

According to some specific embodiments, the apparatus further comprises a first planar optical waveguide and a second planar optical waveguide and a splitter configured to couple at least a portion of light from the first optical waveguide into the second optical waveguide, the second optical waveguide being configured to direct said at least a portion of light to said reflective surface area without crossing a third optical waveguide from the plurality of optical waveguides.

According to some embodiments there is provided a photonic integrated circuit comprising a planar optical waveguide structure including a substrate and two planar optical waveguides thereon; a solid structure having a body and two branches connected to the body, each of the two branches having a reflective surface area thereon; each of the two planar optical waveguides being configured to optically end-couple to the reflective surface area of a corresponding one of the branches; wherein the planar optical waveguide structure includes a third planar optical waveguide on the substrate, the third planar optical waveguide having a segment located between the solid structure and the substrate.

According to some specific embodiments, at least one planar optical waveguide is configured to tap at least a portion of light from another planar optical waveguide and direct said at least a portion of light to a corresponding reflective surface area without crossing another planar optical waveguide.

According to some specific embodiments, the photonic integrated circuit further comprises a first planar optical waveguide and a second planar optical waveguide and a splitter configured to couple at least a portion of light from the first optical waveguide into the second optical waveguide, the second optical waveguide being configured to direct said at least a portion of light to said reflective surface area without crossing a third optical waveguide from the plurality of optical waveguides.

According to some specific embodiments, the photonic integrated circuit further comprises an array of optical detectors.

BRIEF DESCRIPTION OF THE DRAWINGS

For a more complete understanding of the present disclosure, reference is now made to the following descriptions taken in conjunction with the accompanying drawings, which are provided for illustration purposes only and not to scale.

DETAILED DESCRIPTION

One type of PLC that the present disclosure is, without limitation, concerned with is a photonic integrated circuit (PIC) using turning mirrors. A turning mirror as used herein refers to a structure having at least one reflecting surface that is capable of reflecting an incoming light beam such that the incoming light beam's direction is turned in a direction that is non-parallel to the incoming beam's direction.

Some examples of a turning mirror for use in PLCs are described in US20110129181 the content of which is hereby incorporated by reference in its entirety. For example a PLC may comprise an optical waveguide on a substrate having a planar surface. The optical waveguide may be located on and preferably parallel to the planar surface with an end located and oriented to emit or receive light propagating substantially parallel to the planar surface. The exemplary device also comprises a turning mirror bound to the planar surface. The turning mirror has a reflecting surface that is slanted (sloped) relative to the planar surface. The reflecting surface is configured to reflect the incoming light emanating from the waveguide in a direction that is non-parallel to the direction of the incoming light. Such turning mirrors may be micro-machined. Therefore, such turning mirrors may be inserted into a trench (or cavity) provided in the PLC and be used for reflecting the light from a direction in which it is traveling along a waveguide to another direction in which it may impinge on a light detector (e.g. a photodetector), the whole assembly being very compact and efficient.

In some cases a plurality of waveguides may exist on a PLC and the light traveling in each of the plurality of the waveguides may be detected using a respective turning mirror located close to the end of the waveguide from which the light is output. A plurality of photodetectors may then be used to detect the plurality of light beams by placing a respective photodetector in correspondence to a respective turning mirror from which the photodetector receives the light beam to be detected.

On the other hand in some other cases, it may be necessary that the light of some of the waveguides, but not all of them, is detected. One solution to address this situation would be to install a respective turning mirror and a respective photodetector for each one of the waveguides whose light needs to be detected.

Figure 1A:
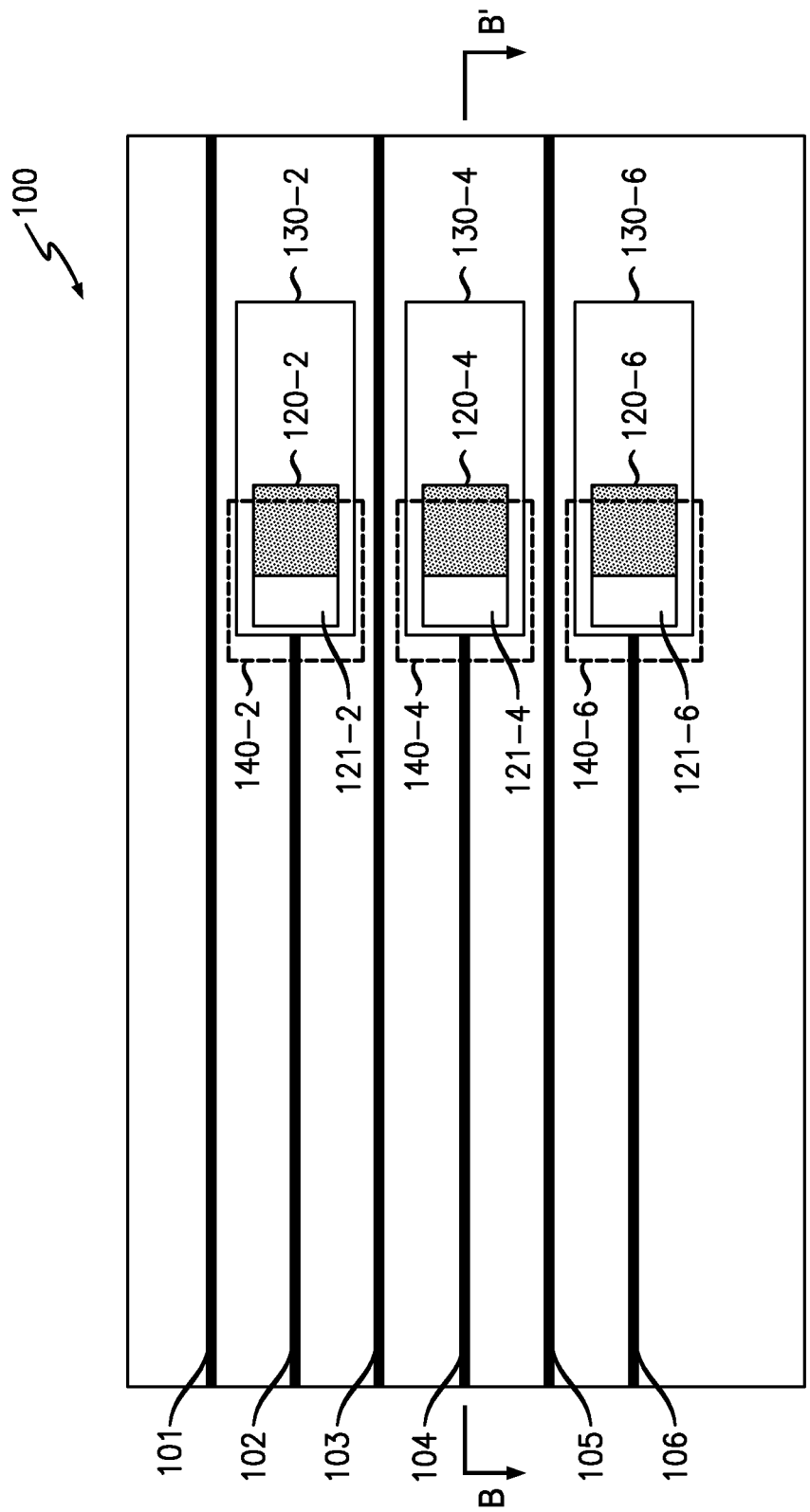
FIGS. 1A and 1B are respectively exemplary schematic representations of top view and cross-sectional side view of a PLC illustrating a plurality of waveguides and individual turning mirrors corresponding to some of the waveguides.
Figure 1B:
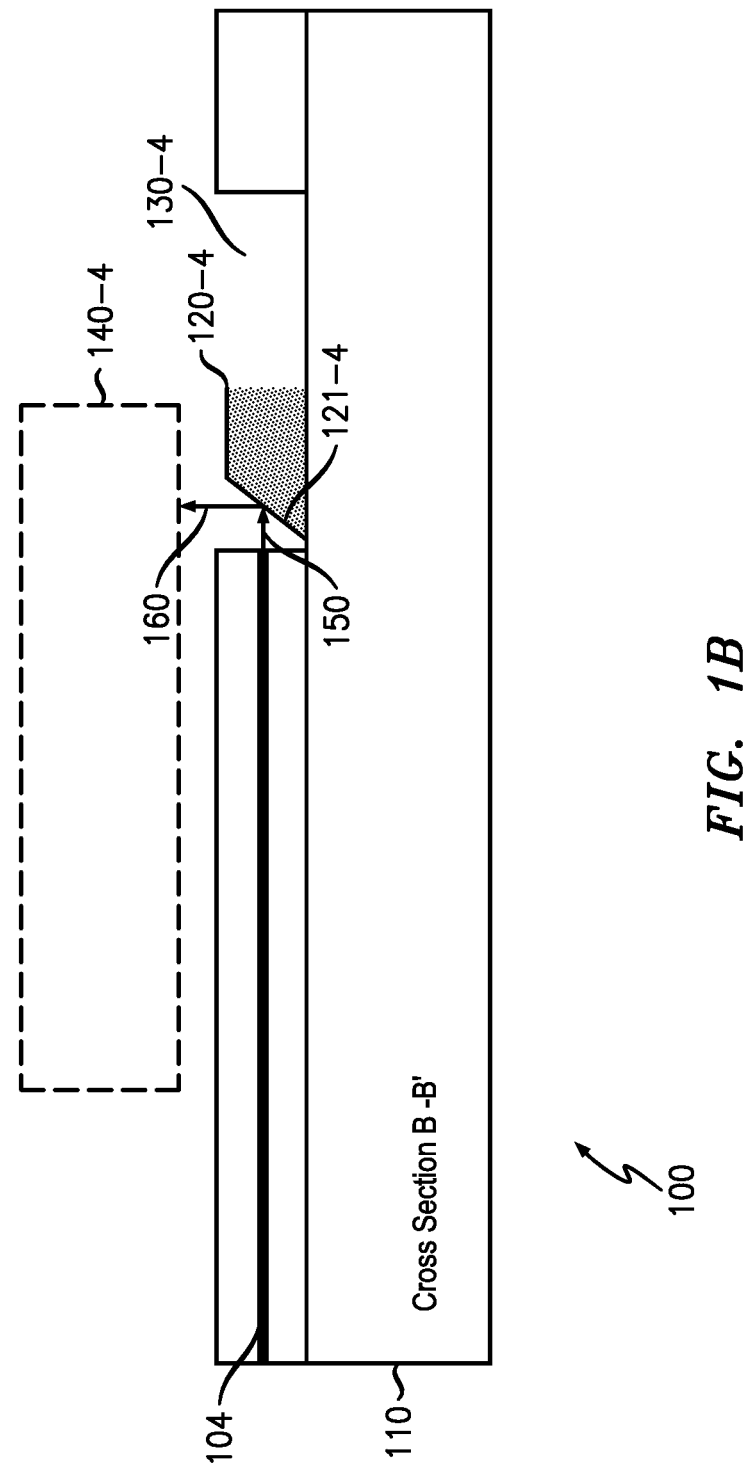

FIGS. 1A and 1B schematically illustrate the above situation in which a PLC 100 is provided with a plurality of waveguides 101-106 located on a substrate 110. In particular FIG. 1A illustrates a top view of the PLC and FIG. 1B illustrates a side view of the PLC taken from a cross section of the device along the line B-B' of FIG. 1A. Further details of the structure and operation of optical detection using the waveguide-tuning mirror assembly may be found in the aforementioned US patent application US20110129181.

As mentioned above, in this case it is needed that the light of some, but not all, of the waveguides be detected. In the example of FIGS. 1A and 1B it is assumed that the light beams traveling in waveguides 102, 104 and 106 need to be detected and the light beams traveling in waveguides 101, 103 and 105 need not.

The PLC 100 further comprises a plurality of turning mirrors 120-2, 120-4 and 120-6 located close to the end of some of the waveguides 102, 104 and 106, each turning mirror being located in a respective cavity 130-2, 130-4 and 130-6. Each turning mirror has a reflective surface area 121-2, 121-4 and 121-6 capable of reflecting incoming light from a first direction 150 to a second (reflected) direction 160 where the reflected light can impinge on a corresponding optical detector located at a position to suitably receive the reflected light. For example in FIGS. 1A and 1B the optical detectors may be a plurality of photodetectors 140-2, 140-4 and 140-6 each located above a corresponding reflecting surface 121-2, 121-4, 121-6.

This solution however increases the complexity and the cost of manufacturing the device. In the first place, each of the individual turning mirrors would need to be individually aligned to optimally receive the light which is output from the respective waveguide. Further each individual optical detector would need to be aligned to optimally receive the light reflected from the corresponding reflective surface area.

In order to avoid the above-mentioned problems, an alternative solution may be based on routing (tapping) the light beams that need to be detected from the corresponding waveguides to a specific location on the PLC and use a single mirror and a single optical detector array to monitor the light traveling through these waveguides.

Figure 2:
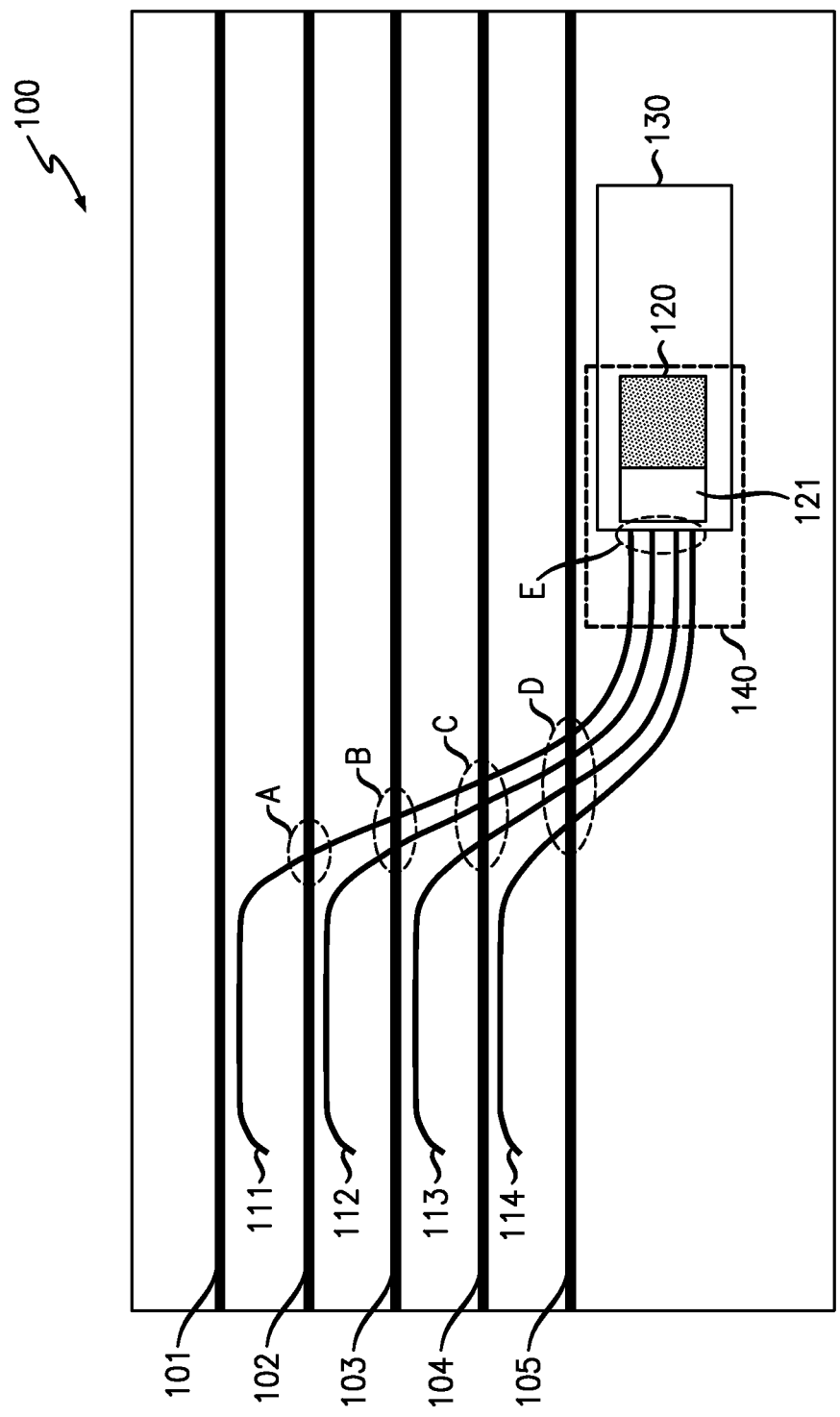
FIG. 2 is an exemplary schematic representation of a top view of a PLC illustrating a plurality of waveguides wherein some of the waveguide are tapped by respective tap waveguides to direct light to a single turning mirror.

FIG. 2 is an exemplary schematic representation of such a solution. In FIG. 2 like elements have been given like reference numeral as those of FIGS. 1A and 1B.

As shown in FIG. 2, a PLC 100 is provided with a plurality of waveguides 101-105. The PLC 100 further comprises a turning mirror 120 placed in a corresponding cavity 130 provided on the substrate of the PLC 100. The turning mirror 120 has a reflective surface area 121 capable of reflecting light from an incoming direction to a reflected direction where the reflected light can impinge on an optical detector 140 is a similar fashion as that described with reference to FIGS. 1A and 1B. In the example of FIG. 2 the optical detector 140 is shown with broken line and is located above the reflective surface area 121.

In the example of FIG. 2, it is assumed that the light beams traveling in waveguides 101-104 need to be detected and the light beam traveling in waveguide 105 need not. In order to facilitate such detection, waveguides 101, 102, 103 and 104 are each tapped using respective tap waveguides 111, 112, 113 and 114. Waveguide 105, in contrast, is not tapped because the light beam traveling in this waveguide does not need to be detected.

The tap waveguides 111-114 are directed to the turning mirror 120 where the end of each tap waveguide, collectively shown in FIG. 2 by reference E, is positioned in front of the turning mirror 120 such that a tapped light beam traveling in a tap waveguide is output therefrom and emitted toward the reflective surface area 121 of the turning mirror 120.

This arrangement however also suffers from certain drawbacks as it gives rise to a large number of waveguide crossings that will negatively affect the performance of the device as such crossings may produce loss and optical cross-talk (herein generally referred to as degradation). As shown in FIG. 2, waveguide 102 is crossed by tap waveguide 111 at point A; waveguide 103 is crossed by tap waveguides 111 and 112 at two different points collectively represented by reference B; waveguide 104 is crossed by tap waveguides 111, 112 and 113 at three different points collectively represented by reference C; and waveguide 105 is crossed by tap waveguides 111, 112, 113 and 114 at four different points collectively represented by reference D. As crossings typically introduce degradation, it may be concluded that the more crossings present on a waveguide, the higher level of degradation is produced on that waveguide. Therefore in the example of FIG. 2, the waveguide 105 suffers from the highest amount of degradation as it is crossed by a higher number of tap waveguides (four) as compared to the other waveguides 102, 103, 104. This is therefore undesirable.

Embodiments of the present disclosure aim at overcoming, or at least substantially reducing, the drawbacks associated with a complex structure having one turning mirror and one photodetector for each one of the waveguides as described with reference to FIGS. 1A and 1B; as well as the drawbacks associated with waveguide crossings as described with reference to FIG. 2.

Figure 3A:
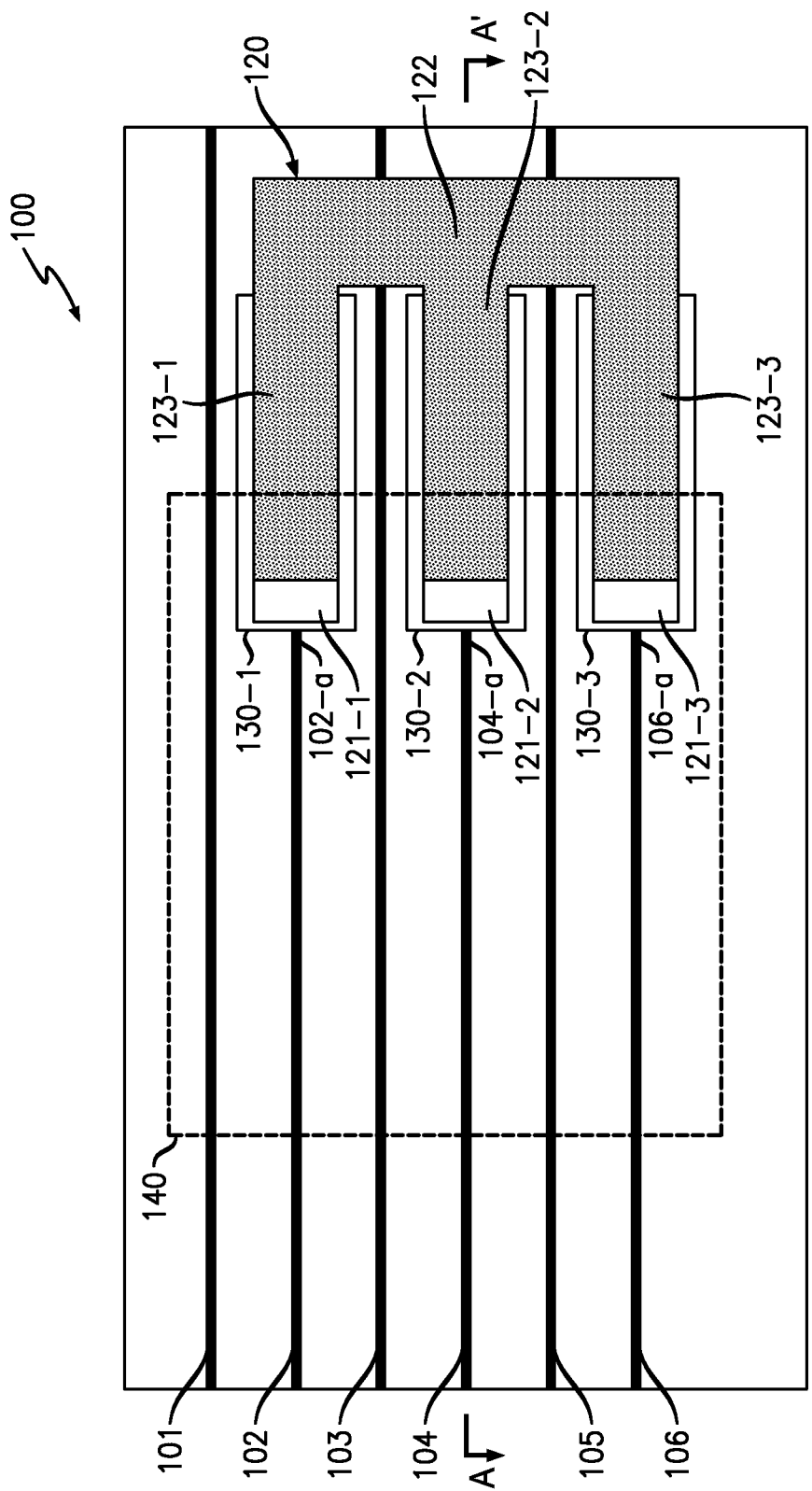
FIGS. 3A and 3B are respectively exemplary schematic representations of top view and cross-sectional side view of an apparatus according to some embodiments of the disclosure.
Figure 3B:
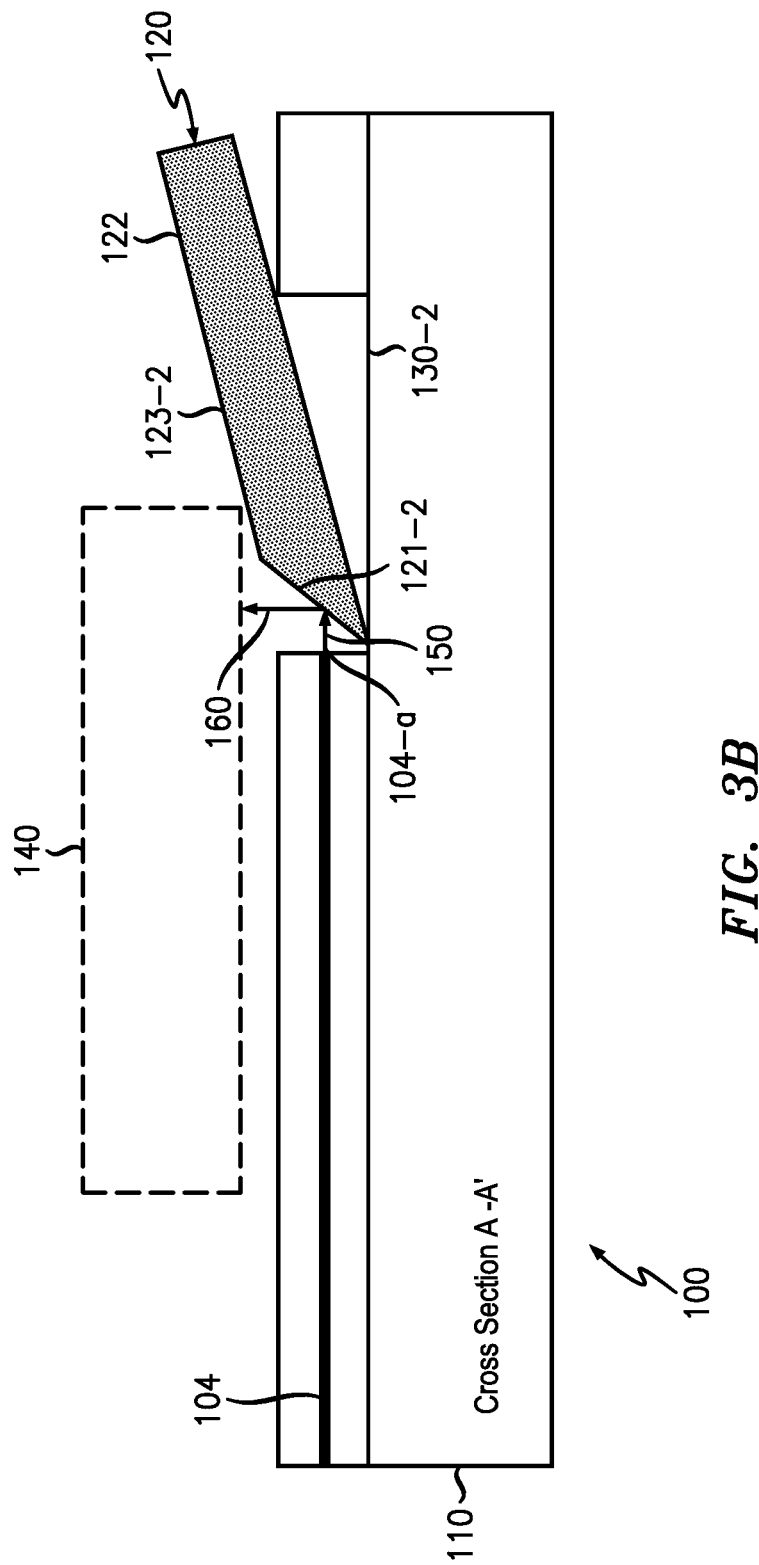

FIGS. 3A and 3B respectively illustrate exemplary schematic representations of top view and cross-sectional side view of an apparatus according to some embodiments of the disclosure. In particular FIG. 3A illustrates a top of view of the apparatus and FIG. 3B illustrates a side view of the apparatus taken from a cross section of the device along the line A-A' of FIG. 3A.

In FIGS. 3A and 3B, like elements have been given like reference numerals as those of FIGS. 1A, 1B and 2. The apparatus may be a PLC; in particular apparatus 100 may be made in a variety of manners as a PIC where each PIC may be usable for a different application or applications. Therefore, although in the following, examples of embodiments are provided related to detection of light beams, the disclosure is not so limited and other applications or equipment such as laser sources may also use the solution provided herein.

Referring simultaneously to FIGS. 3A and 3B, the apparatus 100 comprises a planar optical waveguide structure including a substrate 110 and a plurality of planar optical waveguides 101-106 on the substrate (only six shown for the sake of clarity and simplicity while any convenient number of waveguides may be present in the apparatus). The apparatus further comprises a solid structure 120, herein also referred to as a turning mirror or simply a mirror. The mirror comprises a main body 122 (herein also referred to as body) and plurality of branches 123-1, 123-2 and 123-3. Although only three branches have been shown in FIG. 3A, the disclosure is not so limited and the turning mirror 120 may comprise any convenient number (n≥1) of branches 123-1, . . . , 123-n. Each branch is joined to the body 122 at one end and has a respective reflective surface area 121-1, 121-2 and 121-3 (121-n) at an opposite end. The reflective surface area 121-1, 121-2, 121-3 is capable of reflecting light from a first (incoming) direction to a second (reflected) direction in a similar fashion as that of the reflective surface areas described above with reference to FIGS. 1A, 1B and 2.

In the example of FIGS. 3A and 3B, it is assumed that the light beams traveling in waveguides 102, 104 and 106 need to be detected.

However, differently from the configuration of apparatus in FIGS. 1A and 1B the waveguides 102, 104 and 106 are each directed to a respective branch of the turning mirror 120 where the end of each of said waveguides 102, 104 and 106 is positioned close to, and preferably facing, a reflective surface area of the corresponding branch of the turning mirror 120. Therefore, as shown in FIG. 3A, waveguide 102 has an end 102-a positioned close to (e.g. facing) the reflective surface area 121-1 such that a light beam output therefrom is received by the reflective surface area 121-1 of branch 123-1 of the turning mirror 120. Likewise, waveguide 104 has an end 104-a positioned close to (e.g. facing) the reflective surface area 121-2 such that a light beam output therefrom is received by the reflective surface area 121-2 of branch 123-2 of the turning mirror 120, and waveguide 106 has an end 106-a positioned close to (e.g. facing) the reflective surface area 121-3 such that a light beam output therefrom is received by the reflective surface area 121-3 of branch 123-3 of the turning mirror 120.

As shown in the cross-sectional view of FIG. 3B the light beam output in a first direction 150 from the end of the tap waveguide 104 impinges on the reflective surface area 121-2 of the branch 123-2 of the turning mirror 120 and is reflected, in a second direction 160, in this case upward, where it impinges on an optical detector 140.

In this manner each of the planar optical waveguides may be configured to optically end-couple to the reflective surface area of a corresponding one of the branches.

In order to detect the light beams reflected from the plurality of reflective surface areas 121-n, an array of optical detectors 140 may be used. Using an array of optical detectors is advantageous as it improves manufacturing processes. This is because the detectors in the array may be attached to the device, e.g. a PLC) in one single step, as opposed to attaching individual detectors which is more time consuming. Furthermore, the array of detectors may be provided on a chip which typically has a larger size than individual detectors, therefore making the handling and connection processes simpler.

The apparatus 100 further comprises a plurality of cavities 130-1, 130-2 and 130-3 such that each cavity is configured to receive at least a portion of a branch of the turning mirror 120.

For example, as shown in FIG. 3A, an end portion of branch 123-1 having the reflective surface area 121-1 at an end thereof is inserted into the cavity 130-1; an end portion of branch 123-2 having the reflective surface area 121-2 at an end thereof is inserted into the cavity 130-2 (see also FIG. 3B); and an end portion of branch 123-3 having the reflective surface area 121-3 at an end thereof is inserted into the cavity 130-3.

The term "end portion" of a branch in the context of the present disclosure is to be understood to refer to not only the end (outermost or tip) of the branch but also a portion of the body of the branch which may start at any convenient intermediate point thereof to the end of the branch. Such intermediate point may be determined according to design requirements of each particular application.

With this arrangement, the body 122 of the turning mirror or at least a portion thereof 122*a* can rest outside of the cavity as more clearly shown in FIG. 3B. The fact that the body of the turning mirror or a portion thereof rests outside of the cavity is advantageous in that it eliminates the need for cutting the intermediate waveguides that pass between the branches of the turning mirror. For example in FIG. 3A waveguides 103 and 105 are intermediate waveguides in the sense that they pass between the branches 123-1/123-2 and 123-2/123-3 respectively, whereas waveguide 101 does not pass between branches. Therefore, if the entire body of the turning mirror 120 were to be located inside the cavity, waveguides 103 and 105 would need to be cut in the region where they would intersect with the turning mirror 120.

Some or all of the reflective surface areas 121-*n* may be sloped (slanted) with respect to the direction 150 of propagation of the incoming light beam. It is preferred that such slope is at an angle such that about a 90° reflection (e.g. direction 160 in FIG. 3B) with respect to the direction of propagation of the incoming light beam is ensured, thereby the light beam is accurately redirected to the desired location where an optical detector is positioned (for example directly above the reflective surface area). In order to ensure the reflection at about 90°, it is preferred that the reflective surface area has a slope at an angle as close as possible to 45° with respect to the direction of propagation of the incoming light beam. Those skilled in the related art may determine the techniques to use for manufacturing micromirrors having a 45°-sloped reflective surface area. One such technique is disclosed in "Formation of ultra-smooth 45° micromirror on (1 0 0) silicon with low concentration TMAH and surfactant: Techniques for enlarging the truly 45° portion" by Yi Wei Xu, Aron Michael, Chee Yee Kwok, Sensors and Actuators A 166 (2011) 164-171 the content of which is incorporated herein by reference in its entirety.

Therefore, in some embodiments, the reflective surface area 121-*n* of a branch 123-*n* has a slope at an angle of about 45° with respect to the direction of propagation of the incoming light beam.

Although 90° reflection of the light beam and 45° of slope angle for the reflective surface area are preferred values, other values such as a range from 70° to 110° for the reflection of the light beam and a range from 35° to 55° for the slope angle of the reflective surface area are also possible for a satisfactory implementation. However, for simplicity, the preferred values are considered in the following.

It is noted that a light beam in real life may not travel completely unidirectional and may therefore undergo beam divergence (i.e. increase in the diameter of the wavefront with distance from the output of the tap waveguide). However, such diverged light beam may be reasonably considered to have a central axis around which the beam has rotational symmetry (such as the height of a cone). Based on such consideration, the direction of propagation of the light beam may be considered to be the central axis of the divergent beam and the above-mentioned slope angles (35° to 55, including 45°) and reflection angles (70° to 110°, including 90°) may be measured from the direction of propagation of the light beam where such direction is along the central axis of the diverging light beam.

In the embodiment of FIGS. 3A and 3B, where a portion 122-*a* of the body rests out of the cavity 130-*n*, it may be considered that the 90° out-of-plane reflection may be slightly deviated due to an additional angle (tilt) caused by the position of the turning mirror being partially inside and partially outside the cavity 130-*n*. It is to be noted however that in a real device, such angle would have a small value and therefore the amount of deviation from the 90° out-of-plane reflection may be negligible, or compensated in case of need, by adjusting the position of the optical detector 140 with respect to the reflective surface area 121-*n*.

In this manner, while some planar optical waveguides, e.g. waveguides 102, 104 and 106 optically end-couple to a corresponding reflective surface are, e.g. 121-1, 121-2 and 121-3 respectively, other planar optical waveguides, e.g. 103 and 105 pass through between the branches of the mirror 120 without being cut such that a segment of each of such planar optical waveguides remains located between the mirror and the substrate.

Figure 4A:
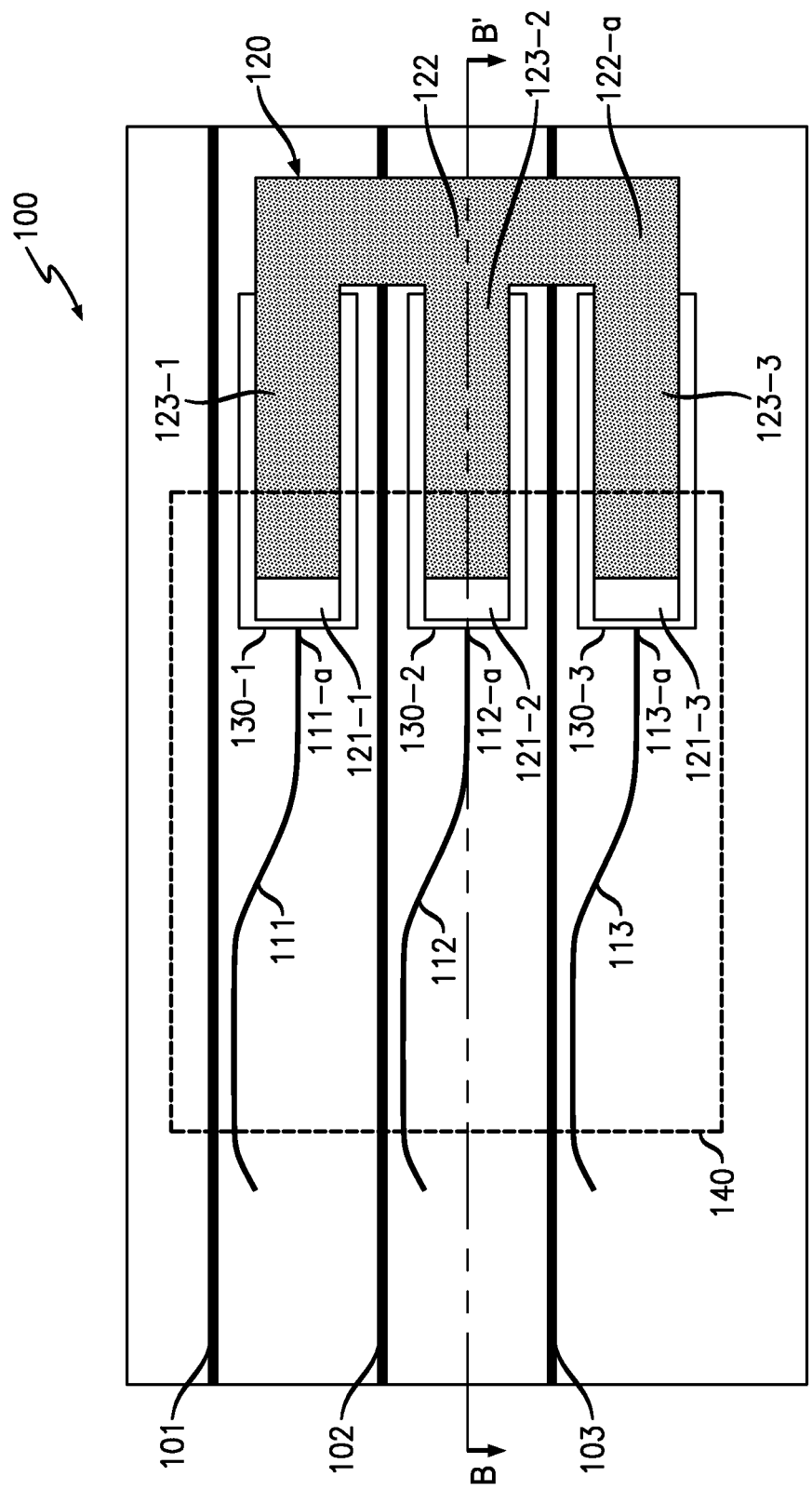
FIGS. 4A and 4B are respectively exemplary schematic representations of top view and cross-sectional side view of an apparatus according to some embodiments of the disclosure.
Figure 4B:
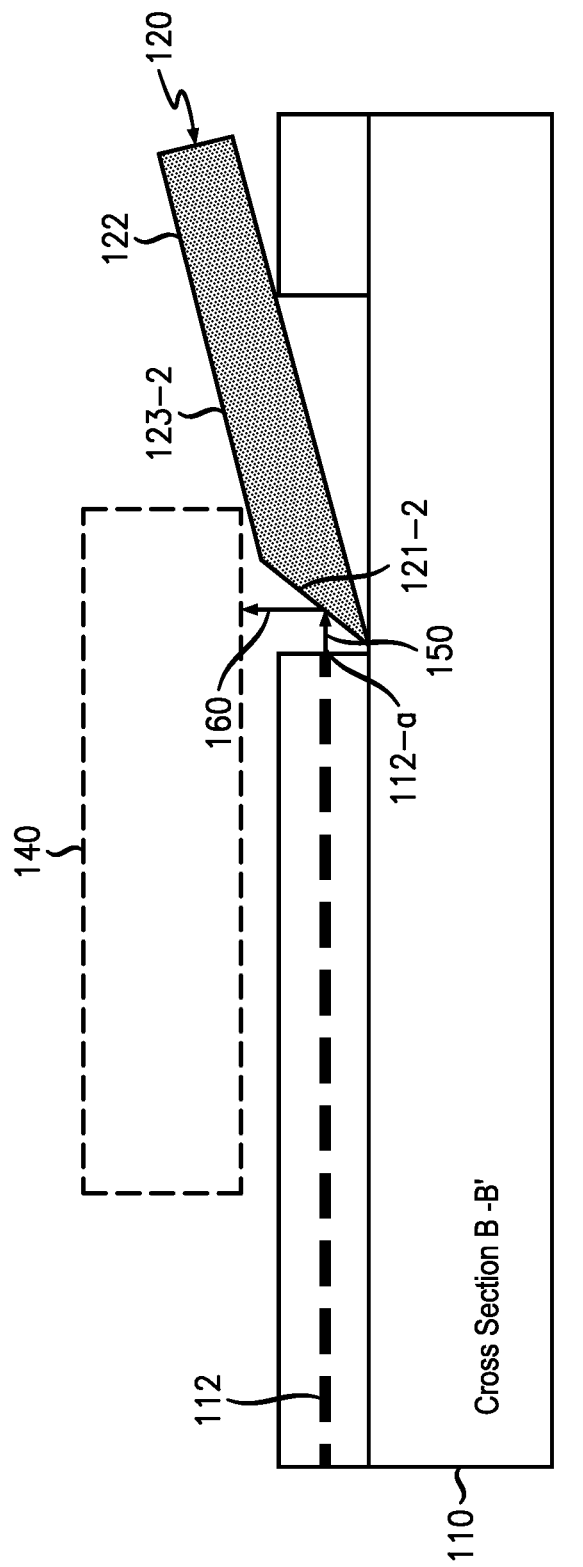

FIGS. 4A and 4B respectively illustrate exemplary schematic representations of top view and cross-sectional side view of an apparatus according to some embodiments of the disclosure. In particular FIG. 4A illustrates a top of view of the apparatus and FIG. 4B illustrates a side view of the apparatus taken from a cross section of the device along the line B-B' of FIG. 4A. It is to be noted that in FIG. 4B, the tapped waveguide 112 is shown by a broken line as the length of waveguide is not entirely along the cross-sectional line B-B'.

In FIGS. 4A and 4B, like elements have been given like reference numerals as those of FIGS. 1A, 1B, 2, 3A and 3B. The apparatus may be a PLC; in particular apparatus 100 may be made in a variety of manners as a PIC where each PIC may be usable for a different application or applications. Therefore, although in the following, examples of embodiments are provided related to detection of light beams, the disclosure is not so limited and other applications or equipment such as laser sources may also use the solution provided herein.

Referring simultaneously to FIGS. 4A and 4B, the apparatus 100 comprises a plurality of waveguides 101-103 (only three shown for the sake of clarity and simplicity while any convenient number of waveguides may be present in the apparatus). The PLC 100 further comprises a turning mirror 120. The turning mirror 120 has a body 122 and plurality of branches 123-1, 123-2 and 123-3. The characteristics and structure of the turning mirror 120 in FIGS. 4A and 4B are similar to those already described with respect to the turning mirror of FIGS. 3A and 3B.

In the example of FIGS. 4A and 4B, it is assumed that the light beams traveling in waveguides 101-103 need to be detected. In order to facilitate such detection, waveguides 101, 102 and 103 are each tapped using respective tap waveguides 111, 112 and 113.

However, differently from the configuration of apparatus in FIG. 2, the tap waveguides 111-113 are each directed to a respective branch of the turning mirror 120 where the end of each tap waveguide is positioned close to, and preferably facing, a reflective surface area of the corresponding branch of the turning mirror 120. Therefore, as shown in FIG. 4A, tap waveguide 111 has an end 111-*a* positioned close to (e.g. facing) the reflective surface area 121-1 such that a tapped light beam output therefrom is received by the reflective surface area 121-1 of branch 123-1 of the turning mirror 120. Likewise, tap waveguide 112 has an end 112-*a* positioned close to (e.g. facing) the reflective surface area 121-2 such that a tapped light beam output therefrom is received by the reflective surface area 121-2 of branch 123-2 of the turning mirror 120. As shown in the cross-sectional view of FIG. 4B the light beam output in a first direction 150 from the end of the tap waveguide 112 impinges on the reflective surface area 121-2 of the branch 123-2 of the turning mirror 120 and is reflected, in a second direction 160, in this case upward, where it impinges on an optical detector 140. Similarly, tap waveguide 113 has an end 113-*a* positioned close to (e.g. facing) the reflective surface area 121-3 such that a tapped light beam output therefrom is received by the reflective surface area 121-3 of branch 123-3 of the turning mirror 120.

Similarly to the embodiment of FIGS. 3A and 3B an array of optical detectors 140 may be used to detect the light beams reflected from the plurality of reflective surface areas 121-*n*.

The apparatus 100 further comprises a plurality of cavities 130-1, 130-2 and 130-3 such that each cavity is configured to receive at least a portion of a branch of the turning mirror 120 in a similar fashion as already described in relation to the embodiment of FIGS. 3A and 3B.

With this arrangement, the body 122 of the turning mirror or at least a portion thereof 122*a* can rest outside of the cavity as more clearly shown in FIG. 4B. Such arrangement has similar advantages as those discussed in relation to FIGS. 3A and 3B.

Although the embodiment of FIGS. 4A and 4*b* has been described in relation to devices using optical tap waveguides in order to couple at least a portion of light propagating into an optical waveguide and direct such at least a portion of light to a reflective surface area of a branch of the mirror, embodiments of the disclosure are not so limited and other techniques to couple a portion of light from the optical waveguide to another optical waveguide and direct the portion of light to a reflective surface area are also to be understood to be within the scope of the present disclosure. For example, instead of tapping a portion of light from an optical waveguide, a splitter may be used to split the light propagating in the optical waveguide and couple a portion of the light, which is split from the optical waveguide into another optical waveguide, the latter optical waveguide being configured to direct said split portion of light to a reflective surface area of a branch of the mirror.

Those skilled in the related art, by reading the present disclosure, will be able to manufacture an apparatus as disclosed herein. For example the processes corresponding to forming optical waveguides, forming a turning mirror with a sloped reflective surface area and providing the cavities may be performed in accordance to the techniques described in the above-referenced patent application US20110129181 to obtain the specific structures as disclosed herein.

What is claimed is:

1. An apparatus comprising a planar optical waveguide structure including a substrate and two planar optical waveguides thereon; a solid structure having a body and two branches connected to the body, each of the two branches having a reflective surface area thereon; each of the two planar optical waveguides being configured to optically end-couple to the reflective surface area of a corresponding one of the branches; wherein the planar optical waveguide structure includes a third planar optical waveguide on the substrate, the third planar optical waveguide having a segment located between the solid structure and the substrate.

2. The apparatus of claim 1 comprising a plurality of cavities wherein a portion of a branch of the solid structure is located inside a cavity and a portion of the body of the solid structure is located outside the cavity.

3. The apparatus of claim 1 wherein a branch is joined to the body at one end and has a respective reflective surface area at an opposite end, the reflective surface area being sloped with respect to a direction of propagation of light from a corresponding planar optical waveguide to the reflective surface area.

4. The apparatus of claim 3 wherein the slope of the reflective surface area is at an angle configured to reflect the light propagating in said first direction to a second direction, said second direction being in a range of about 70° to about 110° with respect to the first direction.

5. The apparatus of claim 3 wherein the slope of the reflective surface area is at an angle in a range of about 35° to about 55° with respect to the first direction.

6. The apparatus of claim 5 wherein the slope of the reflective surface area is at an angle of about 45° with respect to the first direction.

7. The apparatus of claim 1 wherein at least one planar optical waveguide is configured to tap at least a portion of light from another planar optical waveguide and direct said at least a portion of light to a corresponding reflective surface area without crossing another planar optical waveguide.

8. The apparatus of claim 1 comprising a first planar optical waveguide and a second planar optical waveguide and a splitter configured to couple at least a portion of light from the first planar optical waveguide into the second planar optical waveguide, the second planar optical waveguide being configured to direct said at least a portion of light to a corresponding reflective surface area without crossing another optical waveguide from the plurality of optical waveguides.

9. An apparatus comprising:
   a planar optical waveguide structure including a substrate and two planar optical waveguides thereon; a solid structure having a body and two branches connected to the body, each of the two branches having a reflective surface area thereon; each of the two planar optical waveguides being configured to optically end-couple to the reflective surface area of a corresponding one of the branches; wherein the planar optical waveguide structure includes a third planar optical waveguide on the substrate, the third planar optical waveguide having a segment located between the solid structure and the substrate; and
   an array of optical detectors.

10. The apparatus of claim 9 wherein a branch is joined to the body at one end and has a respective reflective surface area at an opposite end, the reflective surface area being sloped with respect to a direction of propagation of light from an end of a corresponding planar optical waveguide, to a second direction different from the first direction and an optical detector from the array of optical detectors is configured to receive and detect the light beam propagating in the second direction.

11. The apparatus of claim 10 wherein the slope of the reflective surface area is at an angle configured to reflect the light propagating in said first direction to said second direction, said second direction being in a range of about 70° to about 110° with respect to the first direction.

12. The apparatus of claim 10 wherein the slope of the reflective surface area is at an angle in a range of about 35° to about 55° with respect to the first direction.

13. The apparatus of claim 12 wherein the slope of the reflective surface area is at an angle of about 45° with respect to the first direction.

14. The apparatus of claim 9 wherein at least one planar optical waveguide is configured to tap at least a portion of light from another planar optical waveguide and direct said at least a portion of light to a corresponding reflective surface area without crossing another planar optical waveguide.

15. The apparatus of claim 9 comprising a first planar optical waveguide and a second planar optical waveguide and a splitter configured to couple at least a portion of light from the first optical waveguide into the second optical waveguide, the second optical waveguide being configured to direct said at least a portion of light to said reflective surface area without crossing a third optical waveguide from the plurality of optical waveguides.

16. A photonic integrated circuit comprising a planar optical waveguide structure including a substrate and two planar optical waveguides thereon; a solid structure having a body and two branches connected to the body, each of the two branches having a reflective surface area thereon; each of the two planar optical waveguides being configured to optically end-couple to the reflective surface area of a corresponding one of the branches; wherein the planar optical waveguide structure includes a third planar optical waveguide on the substrate, the third planar optical waveguide having a segment located between the solid structure and the substrate.

17. The photonic integrated circuit of claim 16 wherein at least one planar optical waveguide is configured to tap at least a portion of light from another planar optical waveguide and direct said at least a portion of light to a corresponding reflective surface area without crossing another planar optical waveguide.

18. The photonic integrated circuit of claim 16 further comprising a first planar optical waveguide and a second planar optical waveguide and a splitter configured to couple at least a portion of light from the first optical waveguide into the second optical waveguide, the second optical waveguide being configured to direct said at least a portion of light to said reflective surface area without crossing a third optical waveguide from the plurality of optical waveguides.

19. The photonic integrated circuit of claim 16 further comprising an array of optical detectors.

\* \* \* \* \*